United States Patent

[11] 3,624,065

[72] Inventors Bernhard Spiess
Offenbach am Main;
Gunther Trapp, Frankfurt am Main, both of Germany

[21] Appl. No. 781,596
[22] Filed Dec. 5, 1968
[45] Patented Nov. 30, 1971
[73] Assignee Farbwerke Hoechst Aktiengesellschaft, vormals Meister Lucius & Bruning Frankfurt am Main, Germany
[32] Priority Dec. 16, 1967
[33] Germany
[31] F 54327

[54] WATER-SOLUBLE BASIC TRIALKYL AMMONIUM PHENYLAZOPYRIMIDINE
5 Claims, No Drawings

[52] U.S. Cl. .......... 260/146 D, 260/154, 260/256.4 C, 260/256.4 N, 260/459, 260/567.6 M, 260/577
[51] Int. Cl. .......... C09b 21/36, C09b 45/00, D06p 1/10
[50] Field of Search .......... 260/146 D, 154

[56] References Cited

UNITED STATES PATENTS

| | | | |
|---|---|---|---|
| 2,675,375 | 4/1954 | Marson et al. | 260/154 |
| 2,980,665 | 4/1961 | Langley | 260/154 |
| 3,042,648 | 7/1962 | Lewis | 260/154 X |
| 3,083,195 | 3/1963 | Elslager | 260/154 |
| 3,374,220 | 3/1968 | Kremer et al. | 260/154 |
| 3,481,918 | 12/1969 | Straley et al. | 260/154 |

*Primary Examiner*—Floyd D. Higel
*Attorney*—Connolly and Hutz

ABSTRACT: Water-soluble basic monoazo dyestuffs of the trialkylammoniumphenylazopyrimidine series which are suitable for dyeing or printing of textile fibrous materials consisting of native or regenerated cellulose, acetate rayon, polyamides, polyesters, polyacrylonitrile or polyvinylidenecyanide to yield yellow dyeings having good fastness to light and wet processing.

WATER-SOLUBLE BASIC TRIALKYL AMMONIUM PHENYLAZOPYRIMIDINE

The present invention relates to new basic azo dyestuffs and to a process for preparing them. More particularly, the present invention relates to new water-soluble basic monoazo dyestuffs which are free from sulfonic acid groups and carboxylic acid groups and which correspond to the general formula I.

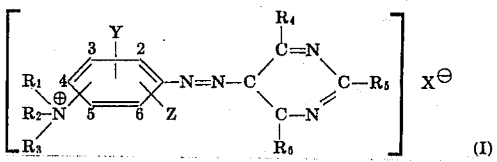

in which $R_1$, $R_2$ and $R_3$ represent lower alkyl groups which may be substituted, Y represents an alkoxy or aryloxy group (for example a lower alkoxy group), Z represents hydrogen or a nonionic substituent (for example a lower alkoxy group), $R_4$, $R_5$ and $R_6$ each represents a primary, secondary or tertiary amino group (for example an amino or a dialkyl amino group wherein each alkyl moiety has from one to four carbon atoms), a hydroxy, alkoxy or alkylmercapto group (for example a lower alkoxy or lower alkyl mercapto group), at least one of the substituents $R_4$, $R_5$ and $R_6$ representing a primary, secondary or tertiary amino group, and $X^\ominus$ represents an anion.

The invention also relates to a process for preparing the above-identified basic monoazo dyestuffs of formula I wherein the diazonium compound of a quaternary amine of the general formula II

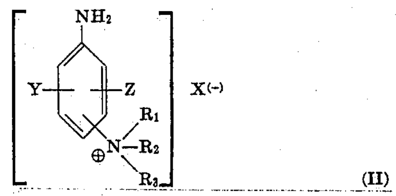

in which $R_1$, $R_2$, $R_3$, Y, Z and X have the above meanings, is coupled with a coupling component of the general formula III

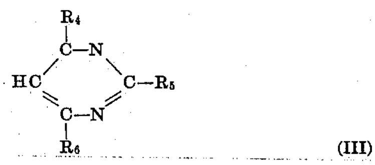

in which $R_4$, $R_5$ and $R_6$ have the meanings given above.

The quaternary amines of formula II used as starting compounds may be obtained by treating an amine of the formula IV

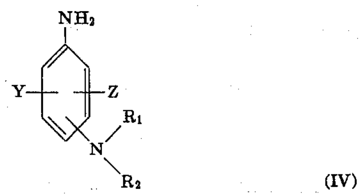

with a quaternating agent which introduces into the molecule the radical $R_3$ and the anion $X^\ominus$ or by quaternating with such an agent a nitroamine of the formula V

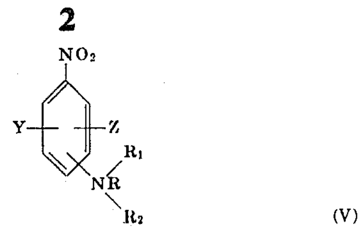

and subsequently reducing the nitro group to the amino group by the usual methods, for example by means of catalysts or iron and hydrochloric acid.

Suitable compounds of formula IV or V are o-, m- or p-amino or nitro-N,N-dialkyl anilines wherein Y represents an alkoxy or aryloxy group and Z represents hydrogen or a nonionic substituent, for example a halogen atom, an alkyl, alkoxy, trifluoromethyl, nitro, alkylsulfone, arylsulfone, aryl, aryloxy, acylamino, acyl, cyano or carboxylic acid ester group, or a carboxylic acid amide or sulfonic acid amide group which may be substituted.

As quaternating agents, there may be used alkyl halides, aralkyl halides, halogeno-acetamides, β-halogeno-propionitriles, halogeno-hydrins, alkyl esters of sulfuric acid or alkyl esters of organic sulfonic acids. Suitable quaternating agents are, for example, methyl chloride, methyl bromide or methyl iodide, ethyl bromide or ethyl iodide, propyl bromide or propyl iodide, benzyl chloride, dimethyl sulfate, diethyl sulfate, benzene-sulfonic acid methyl ester or p-toluene-sulfonic acid methyl-, ethyl-, propyl-, or -butyl ester. Quaternization is carried out in an inert organic solvent, for example, in a hydrocarbon, chloro-hydrocarbon or nitro-hydrocarbon, for example, benzene, toluene, xylene, tetrachloroethane, chloroform, carbon tetrachloride, mono- or dichlorobenzene or nitrobenzene, an acid amide or acid anhydride, for example, dimethylformamide, N-methyl-acetamide, or acetic acid anhydride, dimethyl sulfoxide or a ketone, for example, acetone or methylethylketone. Instead of an organic solvent, there may also be used an excess of the quaternating agent. Quaternization may be effected at an elevated temperature, if desired under pressure. The conditions which are the most favorable in each case can easily be determined in a preliminary test.

The amines of formula II are diazotized by known methods, for example by means of hydrochloric acid and sodium nitrite. The diazonium compounds of the quaternary amines of formula II, wherein the trialkyl ammonium group is linked in p-position to the amino group, may also be obtained by reacting p-chlorobenzene-diazonium-tetrafluoro-borates with a trialkylamine in acetonitrile (cf. Houben-Weyl, "Methoden der organischen Chemie," vol. X/10, page 110 (1965).

Coupling with the coupling components of the formula III is effected by a method known per se, for example, in a neutral or acid medium, if desired or necessary in the presence of a buffer compound or a compound which accelerates coupling, for example, pyridine.

As coupling components of the formula III there are, for example, mentioned 2,4,6-triamino-pyrimidine, 2,4-diamino-6-hydroxy-pyrimidine, 2-dialkylamino-4-amino-6-hydroxy-pyrimidines, 2-alkylmercapto-4-amino-6-hydroxy-pyrimidines, 2,6-dihydroxy-4-amino-pyrimidine, 2-alkylmercapto-4,6-diamino-pyrimidines, 2,4-diamino-6-dialkyl-amino-pyrimidines, 2-amino-4,6-bis-monoalkylamino-pyrimidines, 2-cyanamino-4amino-6-hydroxy-pyrimidine or 2-amino-4-β-hydroxy-ethylamino-pyrimidine.

The dyestuffs obtained according to the present invention preferably contain as the anion $X^\ominus$ the radical of a strong acid, for example, that of sulfuric acid or of its semiesters, of an arylsulfonic acid or of a hydrohalic acid. These anions, introduced according to the process of the present invention can also be replaced by anions of other acids, for example, those of phosphoric acid, acetic acid, oxalic acid, lactic acid or tartaric acid. Furthermore, the dyestuffs can be obtained in form of their double salts with zinc or cadmium halides or as tetrafluoro-borates.

The new dyestuffs are suitable for the dyeing or printing of tannined natural or regenerated cellulose-fibers, silk, leather or synthetic fibers, for example, acetate rayon, polyamide fibers or acid-modified polyester fibers, especially fibers containing polyacrylonitrile or polyvinylidene-cyanide. The dyeings produced on these fibers are generally very clear and very intense and generally have a good fastness to light and to wet processing. The dyestuffs are largely insensitive to changes of the pH value of the dyebath and may therefore be used as well in a weakly acid as in a strong acid bath. Furthermore, they are stable at temperatures of above 100° C., and can be used in the dyeing at high temperatures. Wool is completely reserved by these dyestuffs under normal dyeing conditions.

Compared with the azo dyestuffs disclosed in German Pat. No. 1,072,222, the azo dyestuffs of the process of the present invention are distinguished by a better solubility in water and, thus, by a better applicability.

The following examples serve to illustrate the invention, but they are not intended to limit it thereto, the parts and percentages being by weight unless stated otherwise.

EXAMPLE 1

6.4 parts of 3-nitro-4-methoxyphenyl-trimethylammonium methylsufate were reduced according to Béchamps with 8 parts of iron powder in 30 parts by volume of water and the 3-amino-4-methoxyl-phenyl-trimethylammonium methylsulfate obtained was diazotized, at 0°–5° C., with 6 parts by volume of concentrated hydrochloric acid and 3.2 parts of a 5N sodium nitrite solution. The excess of nitrite was destroyed by means of amido-sulfonic acid and to the cooled diazo solution a solution of 6 parts of 2-dimethyl-amino-4-amino-6-hydroxy-pyrimidine in 150 parts by volume of water and a small amount of dilute sodium hydroxide solution was added slowly. The pH value of the coupling solution was adjusted to 6 by further adding dilute sodium hydroxide solution and sodium acetate. The precipitated dyestuff was suction filtered and dried at 60° C. 8.7 parts of the dyestuff of the formula

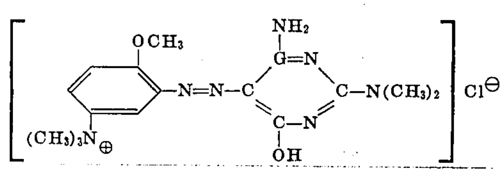

were obtained which dissolves in water and dilute acetic acid to give a yellow solution.

Four grams of the dyestuff were dissolved with 20 cc. of sulfuric acid of 96 percent strength and 400 cc. of hot water and this solution was introduced into a paddling machine filled with 50 1. of water, 100 g. of calcined sodium sulfate and 2 g. of the reaction product of 10 mols of ethylene oxide with 1 mole of nonylphenol. Subsequently, 1 kg. of a knit fabric consisting of polyacrylonitrile staple fibers was dyed in the machine. Dyeing was started at 50° C., the temperature was gradually raised and dyeing was then effected for 1.5 hours at the boiling temperature. After gradual cooling below 70° C., the fabric was carefully rinsed and dried. A clear greenish yellow dyeing was obtained having very good fastness to light and wet processing.

EXAMPLE 2

16.5 parts of 4-nitro--2,5-dimethoxyphenyl-trimethylammonium-methylsulfate (m.p.218° C.) were reduced with 20 parts of iron powder, 30 parts by volume of water and 5 parts by volume of glacial acetic acid. After the iron powder has been removed by filtration, the filtrate was adjusted to a pH of 1 by means of hydrochloric acid and then the amine obtained was diazotized with 9 parts by volume of a 5N sodium nitrite solution. The excess of nitrite was destroyed by means of amido-sulfonic acid and to the ice-cooled diazonium solution a solution of 6.3 parts of 2,4-diamino-6-hydroxy-pyrimidine in dilute sodium hydroxide solution was added slowly. After adjusting this coupling mixture to pH 6 and cooling, the dyestuff precipitated, it was suction filtered and dried. Fourteen parts of the dyestuff of the formula

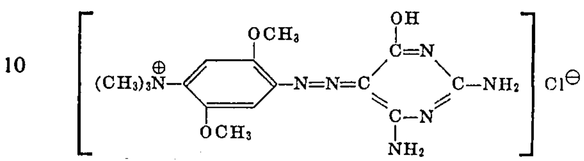

were obtained which dissolves in water and dilute acetic acid to give a yellow-orange solution Five grams of the dyestuff were made into a paste with 15 cc. of acetic acid of 50 percent strength, dissolved in 300 cc. of hot water and this solution was introduced into a dyeing apparatus filled with 6 1. of water, 2 g. of the reaction product of 30 mols of ethylene oxide with 1 mol of nonylphenol, and 3 g. of crystalline sodium acetate. Subsequently, a cross-wound bobbin having 500 g. of polyacrylonitrile staple fiber yarn was placed into the apparatus, the dyebath was slowly heated at an alternating liquor circulation and dyeing was effected at 120° C., within 45 minutes. After cooling to about 70° C. the dyeing was then treated in the usual manner. A clear golden-yellow dyeing was obtained having a very good fastness to light and wet processing.

EXAMPLE 3

2.4 parts of 4-trimethylammonio-2-methoxybenzene diazonium-boron fluoride were dissolved in a small amount of water, a solution of 1.4 parts of 2-dimethylamino-4-amino-6-hydroxypyrimidine in dilute hydrochloric acid was added thereto and this coupling mixture was adjusted to pH 5 by means of sodium acetate. By adding a zinc chloride lye the dyestuff of the formula

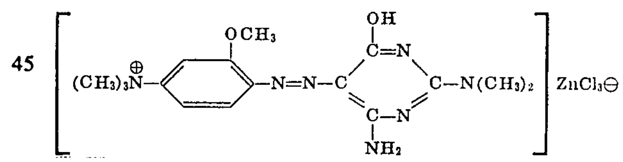

separated, it was suction-filtered, washed with a 10 percent sodium chloride solution and dried. 4.6 parts of a dyestuff were obtained which dissolves in water and dilute acetic acid to give a yellow solution.

One gram of the dyestuff was made into a paste with 2 cc. of acetic acid of 50 percent strength and dissolved in 5 1. of water, whereupon 1 g. of crystalline sodium acetate was added to the dyebath. one hundred grams of a polyacrylonitrile staple fiber yarn which has been washed previously were introduced at 60° C. into the dyebath, the temperature was slowly raised to 100° C. and dying was effected for 1 hour at the boiling temperature. Subsequently the dyebath was allowed to cool below 70° C., the yarn was carefully rinsed and dried. A brilliant greenish yellow dyeing was obtained having excellent fastness to light and wet processing.

EXAMPLE 4

Eight parts of 4-trimethylammonio-2-methoxybenzene diazonium-boron fluoride were dissolved in small amount of water. To the solution obtained a cold solution of 3.6 parts of 2,4-diamino-6-hydroxy-pyrimidine in 100 parts by volume of water was added. By adding sodium chloride and a zinc chloride lye the dyestuff of the formula

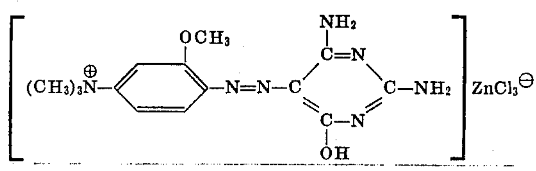

precipitated, it was suction filtered, washed with a 10 percent sodium chloride solution and dried. Fifteen parts of a dyestuff were obtained which dissolves easily in water and dilute acetic acid to give a yellow solution.

Twenty grams of the dyestuff were dissolved hot in 50 g. of acetic acid of 50 percent strength and 730 cc. of water. The solution was stirred into 200 g. of an acid-resistant thickening (1:50) and combined with 20 g. of the reaction product of 8 mols of ethylene oxide and 1 mol of isotridecyl alcohol. The liquor obtained was used for padding a fabric made of polyacrylonitrile staple fibers. Then the pad dyeing obtained was steamed for about 10 minutes with overheated saturated steam at 102°–104° C. and the dyeing was then treated in the usual manner. A clear intense yellow dyeing was obtained having very good fastness to light and wet processing.

The following table indicates other dyestuffs which can be obtained according to the present invention, and the tints of the dyeings produced with them on polyacrylonitrile fibers.

TABLE

| $R_1$–$R_3$ | Position of $-N(R_1)(R_2)(R_3)$ group | Y | Z | $R_4$ | $R_5$ | $R_6$ | X | Tint |
|---|---|---|---|---|---|---|---|---|
| Methyl | 4 | 2-methoxy | Hydrogen | Hydroxy | Methylmercapto | Amino | $BF_4$ | Yellow. |
| Do | 4 | do | do | do | Cyanamino | do | $BF_4$ | Yellow. |
| Do | 4 | do | do | do | Hydroxy | do | $BF_4$ | Do. |
| Do | 4 | do | do | Amino | Amino | do | $ZnCl_3$ | Do. |
| Do | 4 | do | do | do | Methylmercapto | do | $BF_4$ | Do. |
| Do | 4 | do | 5-methoxy | Hydroxy | Amino | do | Cl | Golden-yellow. |
| Do | 5 | do | Hydrogen | do | do | do | Cl | Yellow. |
| Do | 5 | do | do | do | Dibutylamino | do | Cl | Do. |
| Do | 4 | do | 5-methoxy | do | Dimethylamino | do | $ZnCl_3$ | Do. |

We claim:

1. Water-soluble basic monoazo dyestuffs of the formula

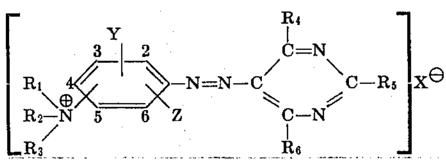

in which $R_1$, $R_2$ and $R_3$ each represent lower alkyl,

Y represents lower alkoxy,

Z represents hydrogen or lower alkoxy, $R_4$, $R_5$ and $R_6$ each represent amino, di-lower alkylamino wherein each alkyl group has one to four carbon atoms, hydroxyl, lower alkoxy or lower alkylmercapto, at least one of $R_4$, $R_5$ and $R_6$ representing amino or di-lower alkylamino wherein each alkyl has one to four carbon atoms, and X represents an anion.

2. The water-soluble basic monoazo dyestuff of the formula

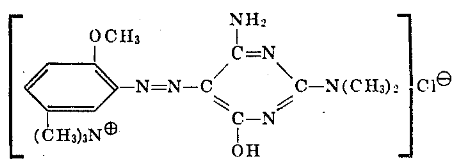

3. The water-soluble basic monoazo dyestuff of the formula

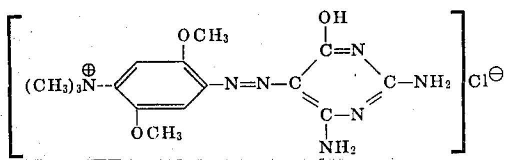

4. The water-soluble basic monoazo dyestuff of the formula

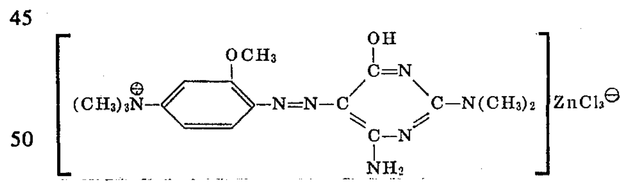

5. The water-soluble basic monoazo dyestuff of the formula

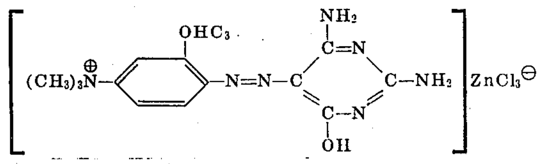

* * * * *